C. D. BOLIN.
THERMOMETER.
APPLICATION FILED SEPT. 10, 1920.

1,390,666.

Patented Sept. 13, 1921.

INVENTOR:
Charles D. Bol'n.
BY F. R. Cornwall
ATTORNEY.

UNITED STATES PATENT OFFICE.

CHARLES D. BOLIN, OF ST. LOUIS, MISSOURI, ASSIGNOR TO AMERICAN THERMOMETER COMPANY, OF ST. LOUIS, MISSOURI, A CORPORATION OF MISSOURI.

THERMOMETER.

1,390,666.   Specification of Letters Patent.   Patented Sept. 13, 1921.

Application filed September 10, 1920. Serial No. 409,314.

*To all whom it may concern:*

Be it known that I, CHARLES D. BOLIN, a citizen of the United States, residing at city of St. Louis, State of Missouri, have invented a certain new and useful Improvement in Thermometers, of which the following is a full, clear, and exact description, such as will enable others skilled in the art to which it appertains to make and use the same, reference being had to the accompanying drawings, forming part of this specification.

The present invention has relation to improvements in thermometers, more particularly those known as hot water thermometers and which are adapted to be applied to boilers to indicate the temperature of the water therein.

The principal object of my invention is to provide a thermometer, the frame or scale plate of which is formed in one piece, said frame being preferably made of sheet metal or some other material that will stand the heat incident to coating said plate with a vitreous or porcelain surface. Heretofore, in order that the scale plate should present a neat appearance and have a smooth surface, said plate was coated with a porcelain surface, but due to the frame proper being made of cast iron, the plate necessarily was formed in a separate piece.

A further object of my invention is to provide an economical and secure mounting for my improved scale plate on the piping or other apparatus in which it is installed.

By making my scale plate or frame of sheet metal which is capable of withstanding the heat necessary to vitrifying the surface, I am enabled to make the scale and scale plate or frame integral, thus providing a neater, simpler and more durable construction than was heretofore possible.

Further and other advantages will be better apparent from a detailed description of the invention in connection with the accompanying drawings, in which—

Figure 1:
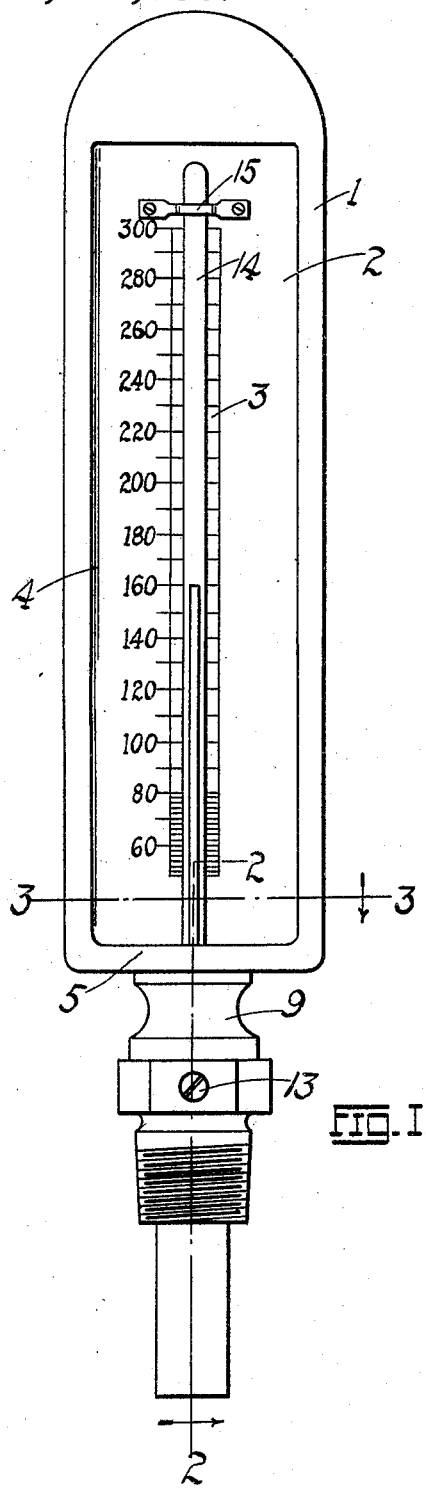
Figure 1 is a front elevation of my improved thermometer.

Referring to the drawings, 1 represents the scale plate or frame of the thermometer, said frame being formed from a single piece of sheet metal and having a depressed surface 2 on which is marked in some manner, so that the markings will be permanent, a scale 3 marked off at suitable intervals into multiples of degrees. The entire face of the frame 1 and depressed surface 2 is porcelainized or coated with a suitable vitreous material shown in Figs. 2 and 3 by the heavy line 4, the object of thus coating the frame is to provide a neat, smooth surface and one that may be readily cleaned and kept free of foreign matter so as to keep the scale and notations visible.

Figure 2:
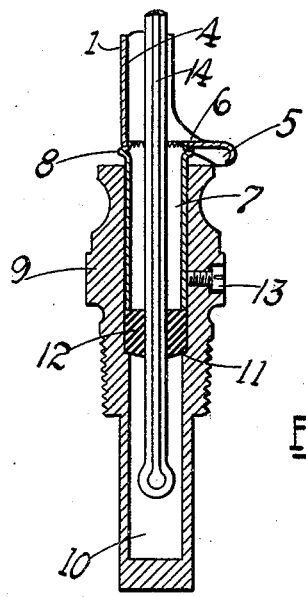
Fig. 2 is a vertical longitudinal section on the line 2—2 of Fig. 1.
Figure 3:
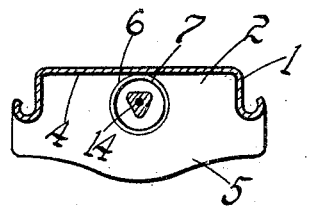
Fig. 3 is a horizontal cross section on the line 3—3 of Fig. 1.

The lower edge of frame 1 projects forward a sufficient distance to form a flange 5, said flange being provided with an opening 6 adjacent to the rear wall of the frame and into which opening is swaged one end of a thimble 7. The thimble 7 is provided with a bead 8 adjacent the end that is swaged into the opening 6, said bead and swaging operating to securely fix the thimble to the flange 5. The location of thimble 7 is such that a portion of its inner surface is in substantial alinement with the rear wall of the frame, as shown in Fig. 2, so that the mercury tube 14 may extend downwardly through the thimble. The frame 1 is mounted on a pipe fitting 9, the latter being provided with a cylindrical bore 10 shouldered at 11 and closed at its outer end. A gasket 12 is slipped into the upper part of the bore 10 and seated against the shoulder 11, after which the thimble 7 is inserted into the bore in abutting relation with the gasket 11. In order to prevent displacement, a set screw 13 is screwed through the fitting 9 and against the thimble 7. The mercury tube 14 is mounted over the scale 3, secured against displacement at its upper end by clip 15 and traverses an opening in the gasket 12.

It will be seen by referring to Fig. 2 that the bulb of the mercury tube projects almost to the bottom of the fitting 9 which is in close proximity to the water in the boiler.

It will be seen from the above description that I have provided a hot water thermometer of simple construction and one that is exceedingly light in weight so that a great saving may be effected in transmitting my thermometers either by express or parcel post. It is obvious that the features of construction of my improved thermometer may be modified without involving a departure from the spirit of the invention.

I claim:

1. A thermometer comprising a frame of pressed metal provided with a flange on its lower end, an opening in said flange, an attaching member for said frame consisting of a cylindrical thimble having one end inserted through and swaged into said opening, and a fluid containing tube mounted on said frame and projecting into said thimble.

2. A thermometer comprising a frame provided with a forwardly projecting flange on its lower end, said flange being provided with an opening, a thimble having a bead abutting against the lower surface of said flange, one end of said thimble being swaged into said opening, a pipe-fitting into which said thimble is secured, and a mercury tube mounted on the frame and extending into the pipe-fitting.

3. In a thermometer, a frame provided with a wall adapted to mount a fluid containing tube, said frame having a flange on one end provided with an opening, and a hollow cylindrical attaching member having one end swaged into said opening and an element of its inner surface substantially alined with said wall.

4. A thermometer comprising a pipe-fitting having a cylindrical bore provided with an annular shoulder and closed at one end, a thimble seated in said bore and being separated from said shoulder by a gasket, a scale plate having a depressed surface coated with a vitreous material, and a forwardly extending flange on its lower end, said flange being provided with an opening to receive one end of the thimble, and a mercury tube secured to the scale plate, said mercury tube extending into the pipe-fitting and traversing the gasket therein.

In testimony whereof I hereunto affix my signature this 7th day of September, 1920.

CHARLES D. BOLIN.